(12) United States Patent
Hashimoto et al.

(10) Patent No.: US 8,350,177 B2
(45) Date of Patent: Jan. 8, 2013

(54) ELECTRIC DISCHARGE MACHINING DEVICE THAT APPLIES A VOLTAGE PULSE BETWEEN A PROCESSING ELECTRODE AND A WORKPIECE

(75) Inventors: Takashi Hashimoto, Chiyoda-ku (JP);
Koichiro Hattori, Chiyoda-ku (JP);
Takashi Yuzawa, Chiyoda-ku (JP);
Yoshikazu Ukai, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 316 days.

(21) Appl. No.: 12/865,068

(22) PCT Filed: Jan. 31, 2008

(86) PCT No.: PCT/JP2008/051553
§ 371 (c)(1),
(2), (4) Date: Jul. 28, 2010

(87) PCT Pub. No.: WO2009/096026
PCT Pub. Date: Aug. 6, 2009

(65) Prior Publication Data
US 2010/0308017 A1 Dec. 9, 2010

(51) Int. Cl.
*B23H 1/00* (2006.01)
(52) U.S. Cl. ............... 219/69.13; 219/69.17; 219/69.18; 700/162
(58) Field of Classification Search ............... 219/69.13, 219/69.17, 69.18; 700/162
See application file for complete search history.

(56) References Cited

U.S. PATENT DOCUMENTS

| | | | | |
|---|---|---|---|---|
| 4,366,360 | A | * | 12/1982 | Inoue .......................... 219/69.17 |
| 5,345,053 | A | * | 9/1994 | Kaneko et al. ............. 219/69.18 |
| 5,603,852 | A | * | 2/1997 | Goto et al. ................. 219/69.13 |
| 7,214,900 | B2 | * | 5/2007 | Hiraishi et al. ............ 219/69.18 |
| 8,093,526 | B2 | * | 1/2012 | Hashimoto et al. ........ 219/69.12 |
| 2005/0127041 | A1 | * | 6/2005 | Kobayashi et al. ........ 219/69.13 |

FOREIGN PATENT DOCUMENTS

| | | |
|---|---|---|
| JP | 62-063014 A | 3/1987 |
| JP | 63-221919 A | 9/1988 |
| JP | 3436019 B2 | 5/1998 |
| JP | 2003-205426 A | 7/2003 |
| JP | 2004-050298 A | 2/2004 |
| JP | 2004050298 * | 2/2004 |
| WO | 02/34444 A1 | 5/2002 |

* cited by examiner

*Primary Examiner* — Kimberly Rizkallah
*Assistant Examiner* — Duy T Nguyen
(74) *Attorney, Agent, or Firm* — Sughrue Mion, PLLC

(57) ABSTRACT

An electric discharge machining device that performs processing by applying a voltage pulse to space between the processing electrode and the workpiece and suitably switching the polarity of the voltage pulse attains both desired processing accuracy and desired controllability. The electric discharge machining device is provided with the first to fourth switching elements. The controlling unit that controls these switching elements, when setting a period time in which the first switching element is turned on, a period of time in which the fourth switching element is in an on-state in the same period, and, when setting a period time in which the second switching element is turned on, a period of time in which the third switching element is in an on-state in the same period so that a desired voltage pulse is applied to the space between the processing electrode and the workpiece.

8 Claims, 7 Drawing Sheets

ELECTRIC DISCHARGE MACHINING DEVICE THAT APPLIES A VOLTAGE PULSE BETWEEN A PROCESSING ELECTRODE AND A WORKPIECE

CROSS REFERENCE TO RELATED APPLICATIONS

This application is a National Stage of International Application No. PCT/JP2008/051553, filed on Jan. 31, 2008, the contents of which is incorporated herein by reference in its entirety.

TECHNICAL FIELD

The present invention relates to an electric discharge machining device that processes a workpiece by use of electrical discharge.

BACKGROUND ART

An electric discharge machining device is a device that processes a workpiece by generating arc discharge between a processing electrode and the workpiece. The electric discharge machining device requires a power supply (discharge processing power supply) for generating the arc discharge, and various structures have been suggested for the processing power supply.

Examples include an electric discharge power supply that is provided with a first power supply unit for generating a voltage pulse to make the processing electrode (hereinafter, "electrode") positive with respect to a workpiece and a second power supply unit for generating a voltage pulse to make the electrode negative with respect to the workpiece, and alternately drives these two power supply units to apply positive and negative discharge pulses to space between the electrode and the workpiece (for example, see Patent Document 1, FIG. 35).

The structures of the power supply units are briefly explained. The first power supply unit includes a capacitor Cq that accumulates electrical charge therein, a DC power source Vs that recharges the capacitor Cq, a charge resistor Rs arranged on the charging path, a switching element Su that feeds the electrical charge accumulated in the capacitor Cq into the space and thereby generates a pulse of discharge voltage, a backflow prevention diode D2 connected in series to the switching element Su, a switching element S1 connected in parallel to the space to short this space, and a backflow prevention diode D1 connected in series to the switching element S1. The second power supply unit includes a capacitor Cr that accumulates electrical charge therein, a DC power source Vt that recharges the capacitor Cr, a charge resistor Rr arranged on the charging path, a switching element Sv that feeds the charge accumulated in the capacitor Cr to the space and thereby generates a pulse of discharge voltage, a backflow prevention diode D4 connected in series to the switching element Sv, a switching element St connected in parallel to the space to short this space, and a backflow prevention diode D3 connected in series to the switching element St.

Furthermore, the discharge machining power supply device described in Patent Document 1 executes the following operations. First, the capacitor Cq is charged by the power supply Vs of the first power supply unit by way of the charge resistor Rs, and the energy charged in the capacitor Cq is supplied to the space between the workpiece and the electrode (hereinafter, "the inter-electrode space", considering the workpiece as an electrode), when the switching element Su is turned on. Here, even if the voltage generated between the electrode and the workpiece (hereinafter, "inter-electrode voltage") increases and leads to discharging, only a limited amount of energy is supplied. Furthermore, the voltage charged in the capacitor Cr by the power supply Vt (reverse voltage with respect to the voltage charged in the capacitor Cq) is applied to the inter-electrode space so that the discharge current quickly disappears. In other words, in the electric discharge machining device described in Patent Document 1, the first power supply unit applies a voltage to perform discharge processing, and then the second power supply unit applies a voltage to prevent discharging from recurring. Thus, a current that tends to flow when discharge processing is not taking place can be blocked, which improves the surface roughness.

In the above control, when discharging does not occur, the charge remains between the electrodes. The inter-electrode state therefore needs to be reset before the next voltage pulse is applied. For this reason, control has to be performed by turning the switching element S1 and the switching element Sv on at the same timing to reset the inter-electrode state even when there is no discharging between the electrodes.

In other words, this discharge machining power supply device performs control to develop a voltage shifted from the capacitor Cq (Cr) between the electrodes in each voltage pulse application cycle, regardless of whether there is discharging, and to reset the shifted voltage in each cycle. The device also performs control after the inter-electrode voltage is reset to raise back the inter-electrode voltage by turning the switching element Su (St) on and applying the voltage developed from the capacitor Cq (Cr).

Patent Document 1: Japanese Patent Application Laid-open No. 2003-205426

DISCLOSURE OF INVENTION

Problem to be Solved by the Invention

To improve the controllability of the electric discharge machining device, the inter-electrode voltage needs to be promptly raised back. For this reason, in the structure of the electric discharge machining device according to Patent Document 1, for example, the electric charge supplied to the inter-electrode space should be supplied not only from the capacitor Cq (Cr) but also from the power supply Vs (Vt). In such a structure, the charge resistors Rs and Rr should be designed to have relatively small resistances.

On the other hand, when the resistances of the charge resistors Rs and Rr are small, the following problem arises.

When the switching element Su is turned on, a voltage is developed between the electrodes first, and the inter-electrode voltage increases as time elapses. When the inter-electrode voltage exceeds the discharge initiation voltage, a discharge current starts flowing between the electrodes. Then, the inter-electrode voltage decreases, and the polarity of the inter-electrode voltage may be reversed by the voltage (inverse voltage) developed by inductance components in the vicinity of the wirings and the inter-electrode space. When the inter-electrode voltage falls below the arc voltage, discharging can no longer be maintained and thus is suspended for the moment. To reduce the surface roughness, it is preferable that the discharging stops at this timing (immediately before the polarity of the inter-electrode voltage is reversed).

However, if the charge fed to the inter-electrode space is supplied not only from the capacitor Cq (Cr) but also from the power supply Vs (Vt) as described above, the inter-electrode voltage further drops after the polarity of the inter-electrode voltage is reversed. The inter-electrode voltage may even exceed the discharge voltage of the opposite polarity and lead to opposite discharging, which worsens the surface roughness.

As discussed above, in the conventional electric discharge machining device described in Patent Document 1, when the controllability is to improve, the desired processing accuracy cannot be achieved. There has been a problem that a desired processing accuracy and desired controllability cannot be accomplished together.

The present invention has been conceived in light of the above. Its purpose is to offer an electric discharge machining device that can accomplish both a desired processing accuracy and desired controllability.

Means for Solving Problem

To solve the above-mentioned problem and to achieve the purpose, an electric discharge machining device that performs processing by applying a voltage pulse between a processing electrode and a workpiece and suitably switching a polarity of the voltage pulse. The electric discharge machining device comprises a first DC power supply having a positive side electrically connected to a side of the workpiece and a negative side electrically connected to a side of the processing electrode, a first switch inserted in a current path connecting the first DC power supply to the workpiece and the processing electrode, and connected to the first DC power supply in series, a second DC power supply having a positive side electrically connected to a side of the processing electrode and a negative side electrically connected to a side of the workpiece, a second switch inserted in a current path connecting the second DC power supply to the processing electrode and the workpiece and connected to the second DC power supply in series, a third switch electrically connected in parallel between the first DC power supply and the first switch that are connected in series and the workpiece and the processing electrode, a fourth switch electrically connected in parallel between the second DC power supply and the second switch that are connected in series and the workpiece and the processing electrode, at least one resistor inserted in a current path from the first DC power supply to the processing electrode and the workpiece and in a current path from the second DC power supply to the processing electrode and the workpiece, and a controlling unit that generates and outputs switching signals to control the first to fourth switches based on processing information necessary for discharge processing, wherein the controlling unit sets, when setting a period of time in which the first switch is turned on, a period of time in which the fourth switch is turned on within the same period of time, and the controlling unit sets, when setting a period of time in which the second switch is turned on, a period of time in which the third switch is turned on within the same period of time.

Effect of the Invention

In the electric discharge machining device according to the present invention, the controlling unit for controlling the first to fourth switches is configured to set, when setting a period of term in which the first switch is turned on, a period of term in which the fourth switch is turned on in the same period, and when setting a period of term in which the second switch is turned on, set a period of term in which the third switch is turned on in the same period. Hence, an electric discharge machining device that achieves both desired processing accuracy and desired controllability can be offered.

EXPLANATIONS OF LETTERS OR NUMERALS

Figure 1:
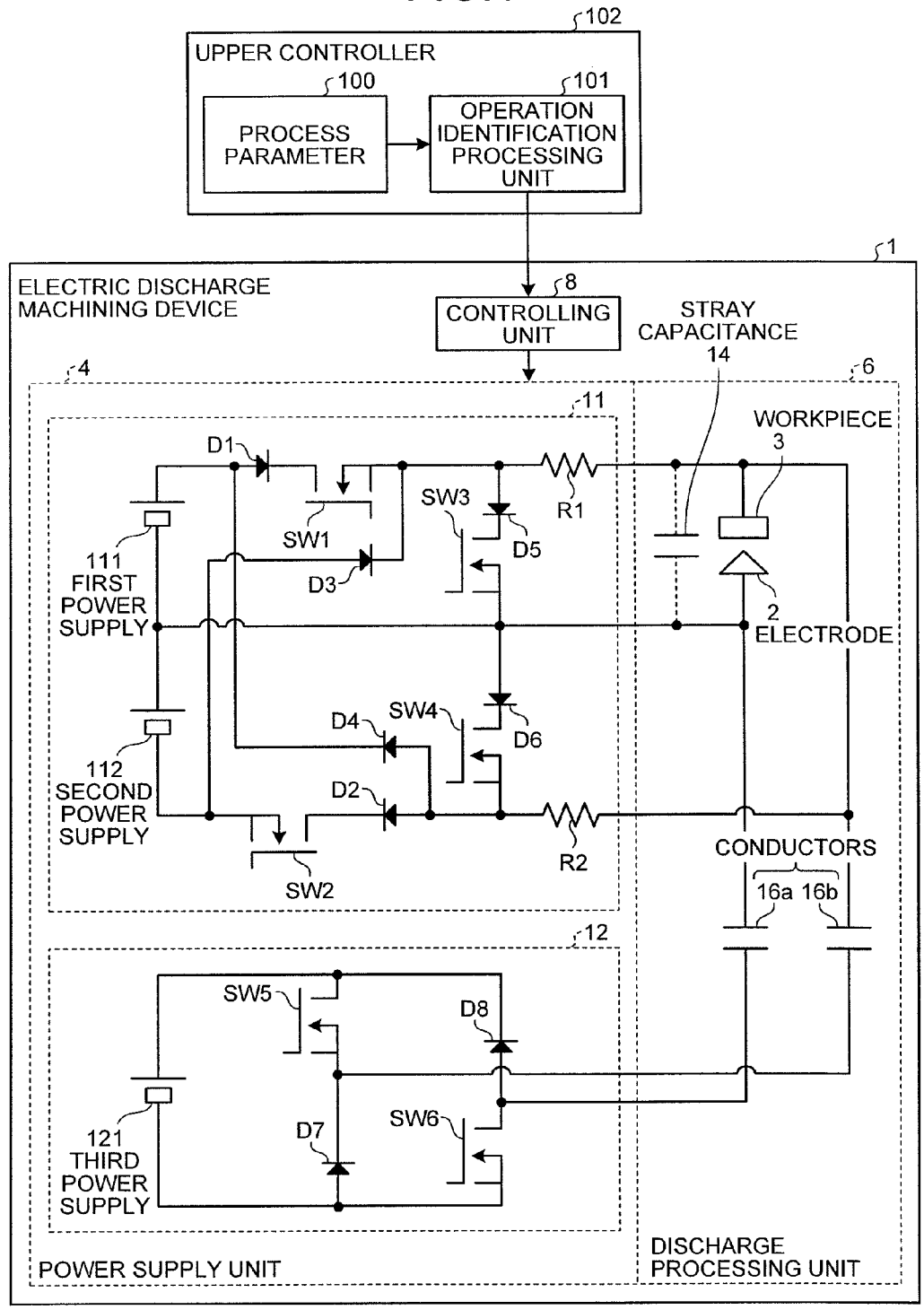
FIG. 1 is a schematic diagram for showing the structure of an electric discharge machining device according to the first embodiment of the present invention.

1 Electric discharge machining device
2 Electrode
3 Workpiece
4 Power supply unit
6 Discharge processing unit
8 Controlling unit
11 Preliminary discharge power supply
12 Main discharge power supply
14 Stray capacitance
16a, 16b Conductors
100 Processing parameter
101 Operation identification processing unit
102 Upper controller
111 First power supply
112 Second power supply
121 Third power supply
D1 to D8 Diodes
R1, R2 Current limiting resistors
Rx, Ry Common resistors
SW1 to SW6 Switching elements

BEST MODE(S) FOR CARRYING OUT THE INVENTION

Exemplary embodiments of the electric discharge machining device according to the present invention are explained in detail below with reference to the attached drawings. The present invention is not limited to the following embodiments, however. In addition, the following circuit structures are presented as examples and can be modified in various manners without departing from the technical scope of the present invention.

First Embodiment

FIG. 1 is a schematic diagram for showing the structure of an electric discharge machining device according to the first embodiment of the present invention. It is a functional block diagram focusing mainly on the power supply unit. In FIG. 1, an electric discharge machining device 1 includes a power supply unit 4, a discharge processing unit 6, and a controlling unit 8.

(Structure of Electric Discharge Machining Device)

In FIG. 1, the power supply unit 4 includes a preliminary discharge power supply (also referred to as "auxiliary power supply") 11 and a main discharge power supply (also referred to as "main power supply") 12. The preliminary discharge power supply 11 is a power supply that generates a preliminary discharge pulse, which is described later, and includes a first power supply 111 that is the first DC power supply, a second power supply 112 that is the second DC power supply, switching elements SW1 to SW4 that are the first to fourth switches, diodes D1 to D6, and current limiting resistors R1 and R2 that are the first and second resistors. The main discharge power supply 12 includes a third power supply 121 that is the third DC power supply, switching elements SW5 and SW6 that are the fifth and sixth switches, and diodes D7 and D8.

The discharge processing unit 6 includes an electrode 2 and a workpiece 3 that are arranged to face each other, and conductors 16a and 16b, which may be mechanical switches, are connected to the electrode 2 and the workpiece 3 to serve as switches for disconnecting each of them from the main discharge power supply 12. A stray capacitance component that is determined in accordance with the shapes and sizes of the electrode 2 and the workpiece 3 or the distance between the electrode 2 and the workpiece 3 (inter-electrode distance) is present between the electrode 2 and the workpiece 3. Thus, such a stray component is indicated as a stray capacitance 14 that is connected between the ends of the electrode 2 and the workpiece 3 as illustrated by the broken lines in FIG. 1.

On the other hand, an upper controller 102 including a process parameter 100 and an operation identification processing unit 101 is provided outside the electric discharge machining device 1. The process parameter 100 includes information indicating processing operations and processing conditions, and the operation identification processing unit 101 identifies control information necessary for performing a discharging process (hereinafter, "processing information"), based on the information of the process parameter 100, and conveys it to the controlling unit 8. The control information here includes voltage polarity information as to whether to perform positive polarity processing or reverse polarity processing, or both of them, and information as to which of the processing speed, the surface roughness, wearing out of the electrode, and the straightness should be given priority.

The controlling unit 8 determines, based on the processing information output by the operation identification processing unit 101, the voltage that is to be applied to the space between the electrode 2 and the workpiece 3 (hereinafter, "inter-electrode application voltage"), and outputs a control signal to control the switching of the switching elements SW1 to SW6. The switching elements SW1 to SW6 are controlled based on the switching signal output by the controlling unit 8 so that a desired inter-electrode application voltage is supplied to the space between the electrode 2 and the workpiece 3.

Next, the connection configurations of the preliminary discharge power supply 11 and the main discharge power supply 12 are explained.

(Connection Configuration of Preliminary Discharge Power Supply 11)

In FIG. 1, the positive terminal of the first power supply 111 is connected to the anode of the diode D1, and the negative terminal is connected to the positive terminal of the second power supply 112. The cathode of the diode D1 is connected to the drain of the switching element SW1, and the source of the switching element SW1 is connected to the current limiting resistor R1. On the other hand, the current limiting resistor R2 is connected to the anode of the diode D2, and the cathode of the diode D2 is connected to the drain of the switching element SW2. Moreover, the source of the switching element SW2 is connected to the negative terminal of the second power supply 112. Furthermore, the negative terminal of the second power supply 112 is connected to the anode of the diode D3, and the cathode of the diode D3 is connected to the current limiting resistor R1. Still further, the current limiting resistor R2 is connected to the anode of the diode D4, and the cathode of the diode D4 is connected to the positive terminal of the first power supply 111.

In addition, the switching element SW3 and the switching element SW4 are connected in parallel to the inter-electrode space. To explain this connection more specifically, the drain of the switching element SW3 is connected to the workpiece 3 by way of the diode D5 and the current limiting resistor R1, and the source of the switching element SW3 is connected to the electrode 2. Similarly, the drain of the switching element SW4 is connected to the electrode 2 by way of the diode D6, and the source of the switching element SW4 is connected to the workpiece 3 by way of the current limiting resistor R2. The current limiting resistors R1 and R2 may have the same resistance or different resistances.

(Connection Configuration of Main Discharge Power Supply 12)

In FIG. 1, the drain of the switching element SW5 and the cathode of the diode D8 are connected to the positive terminal of the third power supply 121, and the anode of the diode D7 and the source of the switching element SW6 are connected to the negative terminal of the third power supply 121. Moreover, the source of the switching element SW5 and the cathode of the diode D7 are connected to each other, and this contact serves as the output point to the workpiece 3. Similarly, the anode of the diode D8 and the drain of the switching element SW6 are connected to each other, and this contact serves as the output point to the electrode 2.

Furthermore, to discuss the usage of the preliminary discharge power supply 11 and the main discharge power supply 12 in general, for example, both of the preliminary discharge power supply 11 and the main discharge power supply 12 are used for rough processing and intermediate finishing, while only the preliminary discharge power supply 11 is used for finishing. When the preliminary discharge power supply 11 only is in use, the conductors 16a and 16b cut off the connection between the main discharge power supply 12 and each of the electrode 2 and the workpiece 3.

(Operation of Electric Discharge Machining Device)

Next, the operation of the electric discharge machining device according to the present embodiment is explained with reference to FIGS. 1 and 2. The following explanation focuses on the operation of the preliminary discharge power supply 11 in the finishing process.

Figure 2:
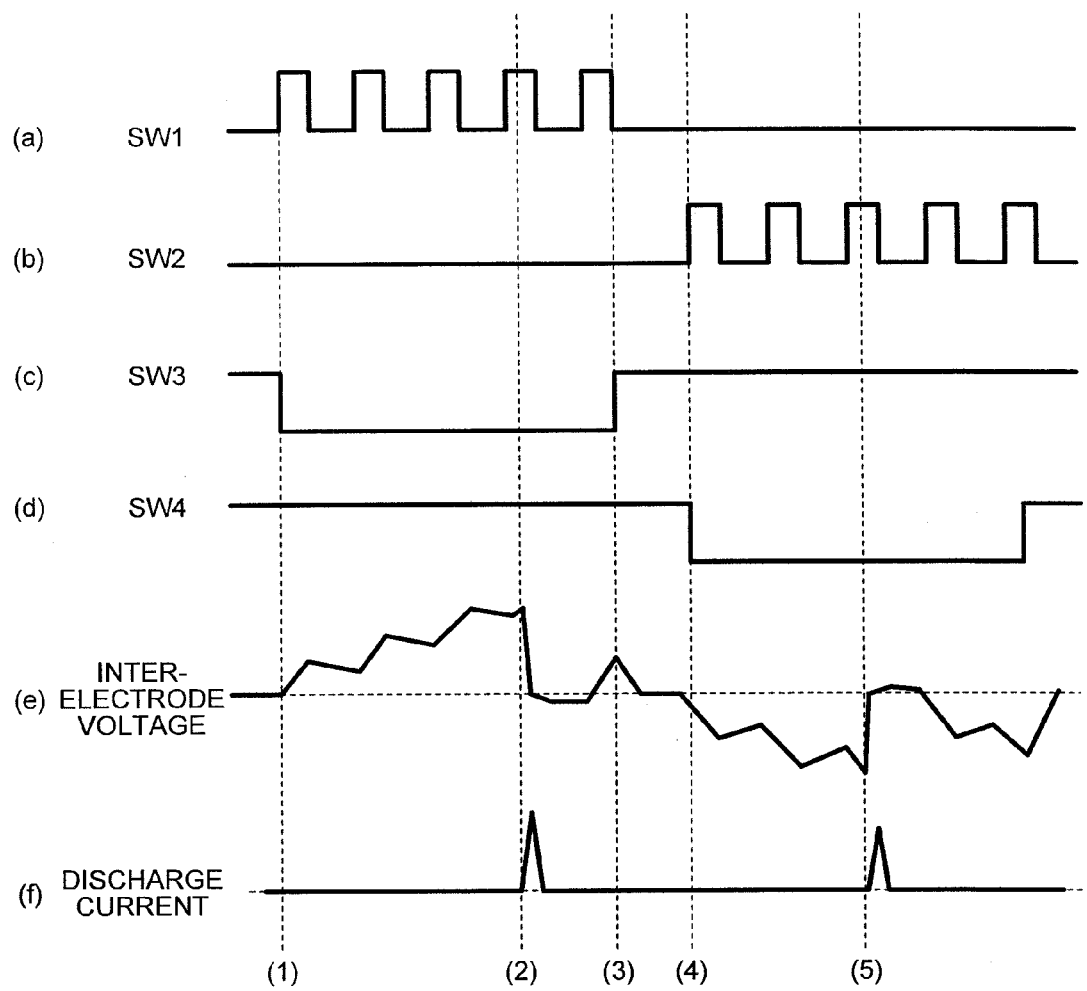
FIG. 2 is a diagram for showing example waveforms of switching signals as well as the corresponding waveforms of the inter-electrode voltage (at the times of non-discharging and discharging) and the discharge current according to the embodiment.

FIG. 2 is a diagram for showing example waveforms of switching signals output by the controlling unit 8 as well as the waveforms of the inter-electrode voltage and the discharge current. More specifically, (a) to (d) of the drawing indicate switching signals applied to the switching elements SW1 to SW4; (e) of the drawing indicates the waveform of an inter-electrode voltage developed by the switching signals shown in (a) to (d) of the drawing; and (f) of the drawing indicates the waveform of a discharge current that flows between the electrodes when the inter-electrode voltage shown in (e) of the drawing is developed between the electrodes.

First, the switching element SW1 is turned on at timing (1) and maintained for a predetermined period of time, and then put off for a predetermined period of time. By repeating the switching operations, the inter-electrode voltage gradually increases, as shown in (e) of the drawing. When it exceeds the discharge initiation voltage at timing (2), insulation breakdown occurs between the electrodes, and a discharge current as shown in (f) of the drawing starts flowing. Here, the on/off operation of the switching element SW1 should be repeated because, even when discharging occurs under the on-operation condition, the power supply current is prevented from flowing from the first power supply 111 into the inter-electrode space by immediately switching off. In other words, the maximum value of the processing energy is defined by the on-pulse width. As mentioned earlier, the polarity is positive when a voltage pulse is supplied from the first power supply 111, while the polarity is negative when a voltage pulse is supplied from the second power supply 112.

A predetermined number of positive pulses are repeatedly applied, and stopped at timing (3). On the other hand, the switching element SW3 is turned on, in synchronization with the falling edge of the switching element SW1 (actually, a time interval of several nanoseconds to several microseconds is posed so that a short-circuit current would not flow between the switching elements). When the switching element SW1 is performing the on/off operation, the switching element SW4 maintains the on-state, and is controlled to be off at timing (4) when the switching element SW2 initiates the on/off operation (actually, several nanoseconds to several microseconds earlier than the timing so that a short-circuit current would not flow between the switching elements).

After timing (4), the operations of the switching element SW1 and the switching element SW2 are reversed, and a predetermined number of negative pulses are repeatedly applied. Thereafter, the inter-electrode voltage exceeds the discharge initiation voltage at timing (5), and a discharge current as indicated in (f) of the drawing starts to flow.

As discussed above, the electric discharge machining device according to the present embodiment can limit the arc discharge to the positive voltage developed at timing (2) in the positive polarity processing. In the same manner, it can limit the arc discharge to the negative voltage generated at timing (5) in the negative polarity processing.

(Discharge Operation of Conventional Electric Discharge Machining Device)

Figure 6:
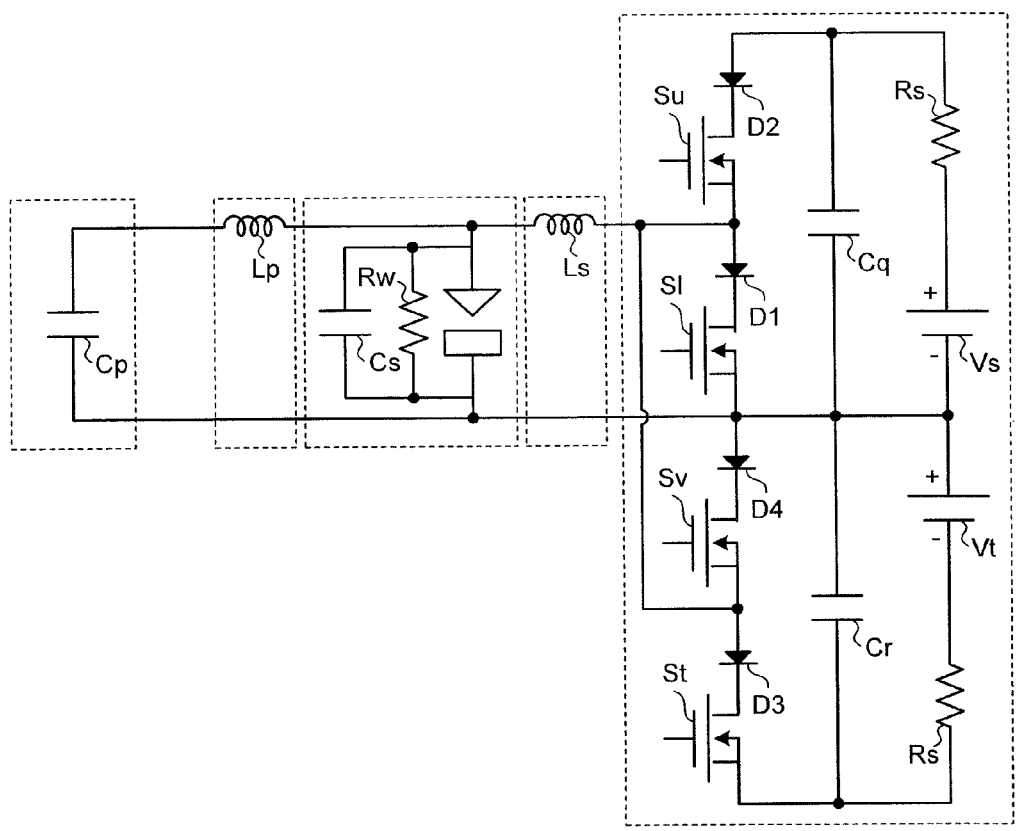
FIG. 6 is a diagram for showing the structure of a conventional electric discharge machining device that is presented as a comparative example.

The discharging operation of a conventional electric discharge machining device is explained with reference to FIGS. 6 and 7. FIG. 6 is a diagram for showing the structure of the electric discharge machining device disclosed in the above Patent Document 1, and FIG. 7 is a diagram for showing example waveforms of switching signals for controlling the electric discharge machining device of FIG. 6 as well as the corresponding waveforms of the inter-electrode voltage and the discharge current.

Figure 7:
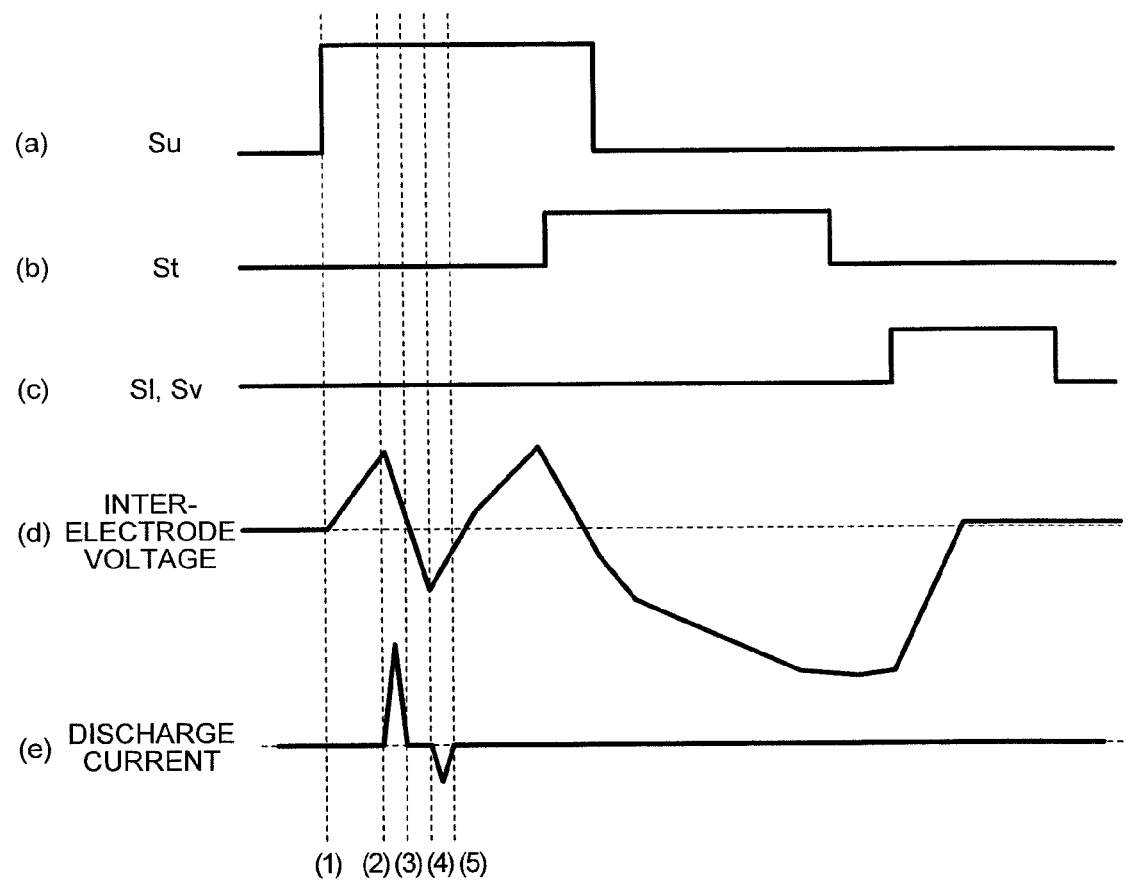
FIG. 7 is a diagram for showing example waveforms of switching signals as well as the corresponding waveforms of the inter-electrode voltage (at the times of non-discharging and discharging) and the discharge current when controlling the electric discharge machining device illustrated in FIG. 6.

When the switch Su is turned on at timing (1) in FIG. 7, the inter-electrode voltage starts increasing. At timing (2) when it exceeds the discharge initiation voltage, insulation breakdown occurs between the electrodes, and a discharge current as indicated in (d) of the drawing starts flowing. Meanwhile, once the discharge current starts flowing between the electrodes, the inter-electrode voltage drastically drops due to the inductance components in the vicinity of the wiring and the inter-electrode space, which may reverse the polarity. Once the inter-electrode voltage falls below the arc voltage, the discharging cannot be maintained, and thus no discharge current flows at timing (3). It is preferable that the discharging should be terminated at this timing from the aspect of reduction of the surface roughness. However, because the inter-electrode voltage keeps falling to the negative polarity side, discharging occurs again at timing (4), as shown in (e) of the drawing. The inter-electrode voltage is lowered by the discharging, and the discharging is terminated at timing (5) when the voltage falls below the arc voltage.

As discussed above, in the conventional electric discharge machining device illustrated in FIG. 6, the inter-electrode voltage takes an oscillatory waveform, and thus the discharging becomes uncontrollable, making the desired surface roughness difficult to achieve. In contrast, in the electric discharge machining device according to the above embodiment as illustrated in FIG. 2, the inter-electrode voltage is prevented from becoming an oscillatory waveform, and thus the desired surface roughness can be achieved.

(Major Points of Electric Discharge Machining Device According to Present Embodiment)

Next, the three major points of the electric discharge machining device according to the present embodiment are explained. The first major point according to the present embodiment is that, when the control is performed that, when the on/off operation of the switching element SW1 is terminated or when the on/off operation of the switching element SW2 is terminated, the switching elements SW3 and SW4, respectively, are turned on to bring the inter-electrode voltage back substantially to 0 volts (see (a) to (d) of FIG. 2).

According to the present embodiment, the control is performed that the switching elements SW3 and SW4 are both turned on during the period of time between timings (3) and (4), but it does not always have to be performed in this manner. Only one of the switching elements may be operated in light of the voltage polarity of the electrodes. In other words, the switching element SW3 should be turned on when the on/off operation of the switching element SW1 is terminated, while the switching element SW4 should be turned on when the on/off operation of the switching element SW2 is terminated.

For example, the conventional switching operation as shown in FIG. 7 adopts shifting of the capacitance from the capacitor to the inter-electrode space, and thus it can be regarded as transient voltage pulse application (i.e., application of an apparent half sinusoidal wave to supply an oscillatory pulse). On the other hand, according to the present embodiment, the on/off operation as indicated in FIG. 1 is repeatedly conducted, the inter-electrode voltage is being applied for a relatively long period of time in non-discharging. If the voltage pulse is reversed with a voltage being applied to the inter-electrode space, the reversed power supply voltage is superimposed on the previous voltage. Then, a high voltage may be output and make the processing operation unstable. For this reason, the switching operation as indicated in FIG. 7 cannot be performed.

Thus, according to the present embodiment, control is performed to turn on the switching element SW3 at timing (3) when the on/off operation of the switching element SW1 is terminated. With this control, the charge accumulated in the stray capacitance is consumed over the path of the workpiece 3→the current limiting resistor R1→the diode D5→the switching element SW3→the electrode 2, and the inter-electrode voltage is lowered to the vicinity of 0 volts (see the waveform of FIG. 2(e) at timings (2) to (3)).

Moreover, the second major point according to the present embodiment is that the current limiting resistors R1 and R2 are arranged near the inter-electrode space with respect to the switching elements SW3 and SW4 (see FIG. 1). The current limiting resistor R1 (R2) is meant to limit the current flow from the first power supply 111 (the second power supply 112) to the inter-electrode space at the time of discharging, but it affects the inter-electrode charging and discharging operations. For example, at the time of charging, the inter-electrode voltage increases in accordance with the time constant of the current limiting resistor R1 (R2) and the stray capacitance and the duty ratio of the on/off operation, while at the time of discharging, the inter-electrode voltage decreases in accordance with the time constant of the current limiting resistor R1 (R2) and the stray capacitance only. The current limiting resistor R1 (R2) is selected in consideration of the processing speed (which is linked with "the charging time of the inter-electrode voltage") and the surface roughness (which is linked with "the degree of current limiting"). However, because the voltage lowering rate is at least equal to or lower than the voltage ascending rate, the resistor for charging and discharging can be shared.

Furthermore, according to the present embodiment, by arranging the current limiting resistor R1 (R2) in the vicinity of the inter-electrode space, the influence of an abnormal condition that occurs in the power supply source can be blocked and mitigated by the current limiting resistor R1 (R2).

For example, an error of the switching element SW1 (SW2) and the switching element SW3 (SW4) instantly turned on, or of both elements being on for a short moment is considered. In this situation, a flow-through current passes over the path of the first power supply 111→the diode D1→the switching element SW1→the diode D5→the switching element SW3→the first power supply 111 (the second power supply 112→the diode D6→the switching element SW4→the diode D2→the switching element SW2→the second power supply 112). This flow-through current can be eliminated by turning off the switching element SW3 (SW4) or the switching element SW1 (SW2). On the other hand, due to the operation of turning off the switching element SW3 (SW4) or the switching element SW1 (SW2), the energy accumulated in the floating inductance components on the path develops a high voltage. This high voltage appears momentarily as a surge, but it is unfavorable, significantly reducing the processing quality when the voltage is output directly to the inter-electrode space. In contrast, according to the present embodiment, the current limiting resistor R1 (R2) is arranged in the vicinity of the inter-electrode space, or of the output terminal of the circuit, and thus the current caused by any error can be blocked and the processing quality degradation can be avoided.

Furthermore, the third major point according to the present embodiment is that the switching element SW4 (SW3) is kept in the on-state during the on/off operation of the switching element SW1 (SW2). With the conventional driving method indicated in FIG. 7, there is a possibility that the arc discharge becomes continuous instead of being intermittent if the voltage waveform oscillates at the discharge initiation timing. In contrast, in the operation according to the present embodiment, excessive energy can be consumed by way of the switching element SW4 (SW3), and the discharge can be reliably stopped.

More specifically, when discharging starts at timing (2), a positive voltage where the potential of the workpiece 3 is higher than that of the electrode 2 is applied. As discussed above, if oscillation components are generated by discharging, the voltage may be inversed to a negative voltage, where the potential of the electrode 2 is higher than that of the workpiece 3.

However, according to the present embodiment, such a negative voltage is eliminated over the path of the electrode 2→the diode D6→the switching element SW4→the current limiting resistor R2→the workpiece 3, and the inter-electrode voltage is kept down in the vicinity of 0 volts. Thus, the negative voltage is prevented from exceeding the discharge initiation voltage. In other words, the arc discharge is limited only to the positive voltage that appears at timing (2). The current limiting resistor R2 serves here as a damping resistor.

Similarly, at timing (5), even if an oscillatory waveform appears due to the discharge of the negative voltage and the positive voltage is increased, the positive voltage is eliminated over the path of the workpiece 3→the current limiting resistor R1→the diode D5→the switching element SW3→the electrode 2, and the inter-electrode voltage is kept down in the vicinity of 0 volt. Thus, the positive voltage is prevented from exceeding the discharge initiation voltage. With such operations, surface roughness reduction that could be caused by unnecessary discharge can be avoided, and degradation of the processing quality can be avoided.

According to the present embodiment, the diodes D3 and D4 are inserted as indicated in FIG. 1. For example, if a short circuit occurs between the electrodes when the switching element SW1 is on, the short-circuit current flows in the path of the first power supply 111→the diode D1→the switching element SW1→the current limiting resistor R1→the workpiece 3→the electrode 2→the first power supply 111. When the switching element SW1 is turned off in this situation, some surge voltage appears in the circuit even with the arrangement of the current limiting resistor R1. The diodes D3 and D4 operate in a regenerative manner toward the power supply when the surge voltage exceeds the power supply voltage.

More specifically, the voltage that appears at the moment at which the switching element SW1 is turned off is fed back to the second power supply 112 over the path of the workpiece 3→the electrode 2→the second power supply 112→the diode D3→the resistor R1→the workpiece 3. In a similar manner, the surge voltage that appears at the moment at which a short circuit occurs between the electrodes during the on-state of the switching element SW2 and the switching element SW2 is turned off is fed back to the first power supply 111 over the path of the electrode 2→the workpiece 3→the current limiting resistor R2→the diode D4→the first power supply 111→the electrode 2. These regenerative operations avoid breakage of the elements.

In the switching waveforms indicated in FIG. 2, the switching element SW4 (SW3) is maintained in the on-state, but it is not a main issue. The essential point is that a reverse voltage that may appear due to the oscillation components from the discharging (a negative voltage in positive processing and a positive voltage in negative processing) should be eliminated, and that the inter-electrode voltage should be brought down in the vicinity of 0 volts. From this point of view, a period of time in which the switching element SW4 (SW3) is in an on-state (i.e., a predetermined period of time in which it is kept on) should be provided during the on-state of the switching element SW1 (SW2).

In addition, a structure in which resistors are arranged in parallel to the inter-electrode space may be considered to eliminate the oscillation waveform. However, the resistors that are arranged in parallel to the inter-electrode space keep producing losses. Especially when the electrical charge (voltage) remaining between the electrodes that should be consumed during a suspension between the applied pulses is considered, the suspension interval needs to be set to a time constant of several microseconds. To make the function effective, the resistance needs to be set low, and thus the losses of the resistors are not negligible. For this reason, it is not really a preferable method.

Second Embodiment

Structure of Electric Discharge Machining Device

Figure 3:
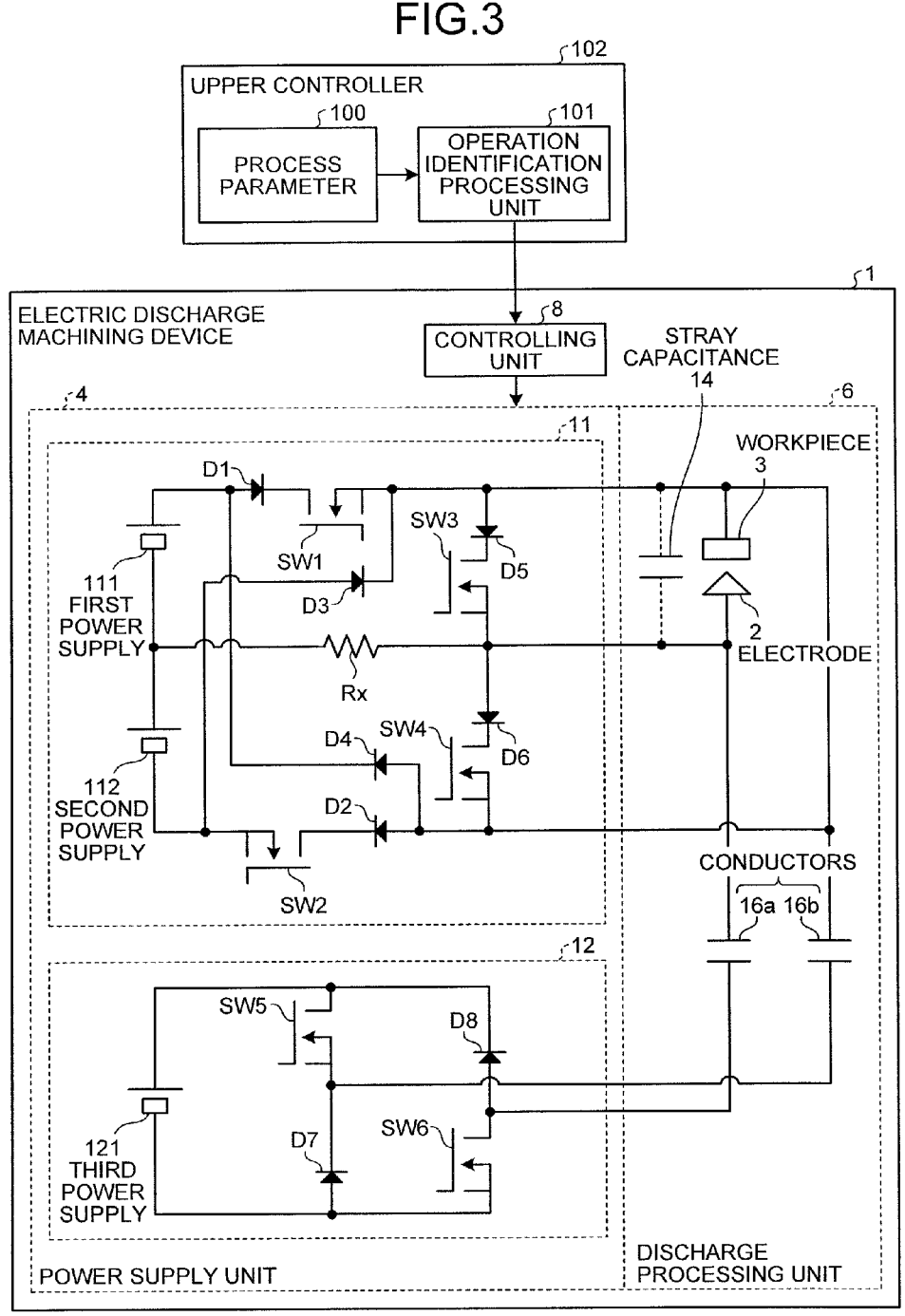
FIG. 3 is a schematic diagram for showing the structure of an electric discharge machining device according to the second embodiment of the present invention.

FIG. 3 is a schematic diagram for showing the structure of an electric discharge machining device according to the second embodiment of the present invention. According to the first embodiment, the current limiting resistors R1 and R2 are arranged individually in correspondence with the first power supply 111 and the second power supply 112. According to the present embodiment, a shared resistor is provided as a common resistor Rx. The common resistor Rx has one end connected to the electrode 2, and is inserted in the common current path between the electrode 2 and the connection point of the first power supply 111 and the second power supply 112. In this structure, the current flowing from the first power supply 111 and the second power supply 112 to the inter-electrode space can be controlled, and moreover, protection against errors of the switching elements can also be provided. The components that are the same as or produce similar effects to the first embodiment are given the same reference numerals, and the explanation thereof is omitted.

(Operation of Electric Discharge Machining Device)

Next, the operation of the electric discharge machining device according to the present embodiment is explained with reference to FIG. 3. In FIG. 3, an arm short circuit where the switching elements SW1 and SW3 are simultaneously turned on is considered. In such a situation, in the structure according to the present embodiment, the current flows in the path of the first power supply 111→the diode D1→the switching element SW1→the diode D5→the switching element SW3→the common resistor Rx→the first power supply 111. Because the common resistor Rx can control the current, breakage of the switching elements SW1 and SW3 can be avoided. The same effect can be obtained for the switching elements SW2 and SW4.

If an error of the switching elements SW1 and SW2 being simultaneously turned on occurs, a short circuit current flows in the path of the first power supply 111→the diode D1→the switching element SW1→the diode D2→the switching element SW2→the second power supply 112→the first power supply 111, and thus the switching elements SW1 and SW2 may be broken. However, as can be clearly seen in the switching waveforms of FIG. 2, the possibility of the switching elements SW1 and SW2 being simultaneously turned on is lower than the possibility of the switching elements SW1 and SW3 (SW2 and SW4) being simultaneously turned on, and thus the structure of FIG. 3 does not practically cause any problem.

If an error of the switching elements SW1 and SW2 being simultaneously turned on should be taken into consideration, a preferable structure is that at least one of the current limiting resistors R1 and R2 indicated in FIG. 1 is arranged and the common resistor Rx indicated in FIG. 3 is inserted. With such a structure, both a short circuit protecting function and a discharge current limiting function can be offered, and a high-quality electric discharge machining device composed of the minimum number of components can be achieved.

Third Embodiment

Figure 4:
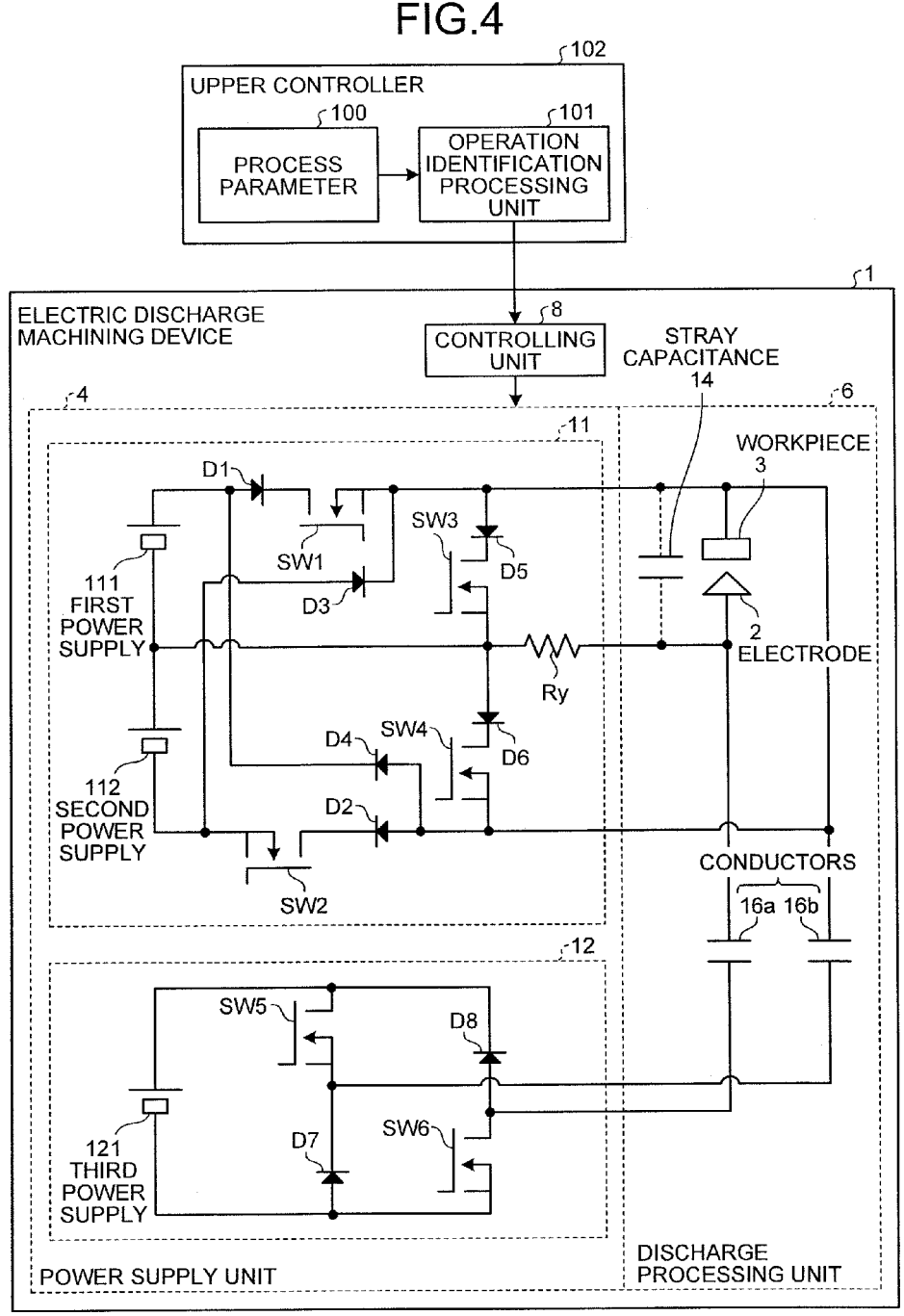
FIG. 4 is a schematic diagram for showing the structure of an electric discharge machining device according to the third embodiment of the present invention.

FIG. 4 is a schematic diagram for showing the structure of an electric discharge machining device according to the third embodiment of the present invention. According to the first embodiment, the current limiting resistors R1 and R2 are arranged in correspondence with the first power supply 111 and the second power supply 112, respectively, whereas according to the present embodiment, a shared resistor is provided as a common resistor Ry. Furthermore, according to the second embodiment, the common resistor Rx that is shared is inserted between the connection point of the first power supply 111 and the second power supply 112 and the connection point of the switching element SW3 and the diode D6. According to the present embodiment, the common resistor Ry that is shared is inserted between the connection point of the switching element SW3 and the diode D6 and the electrode 2. The components that are the same as or produce similar effects to the components according to the first and second embodiments are given the same reference numerals, and the explanation thereof is omitted.

With the structure of the electric discharge machining device according to the third embodiment, in a similar manner to the first and second embodiments, the current flowing from the first power supply 111 and the second power supply 112 to the inter-electrode space can be controlled, and protection against errors of the switching elements can be also provided. Furthermore, in addition to the effects of the first embodiment, the effect of reducing the number of components can be produced in a similar manner to the second embodiment, by arranging the shared common resistor Ry only in the path of charging the stray capacitance 14 and discharging from the stray capacitance 14.

Moreover, instead of inserting the common resistor Ry between the connection point of the switching element SW3 and the diode D6 and the electrode 2, the common resistor may be inserted on the side of the workpiece 3. More specifically, one end of the common resistor is connected to the workpiece 3, and the common resistor is inserted in the common current path connecting each of the first power supply 111 and the second power supply 112 to the workpiece 3. By inserting the common resistor in this manner, the same effect as in the arrangement of the common resistor Ry on the side of the electrode 2 can be obtained.

As explained with respect to the second embodiment, if an error of the switching elements SW1 and SW2 being simultaneously turned on should be taken into consideration, at least one of the current limiting resistors R1 and R2 illustrated in FIG. 1 should be incorporated. In other words, certain resistors should be inserted in at least two connection lines of the three connection lines that connect the discharge processing unit 6 to the preliminary discharge power supply 11. With such a structure, both a short circuit protecting function and a discharge current limiting function can be offered, and a high-quality electric discharge machining device composed of the minimum number of components can be achieved.

Fourth Embodiment

Figure 5:
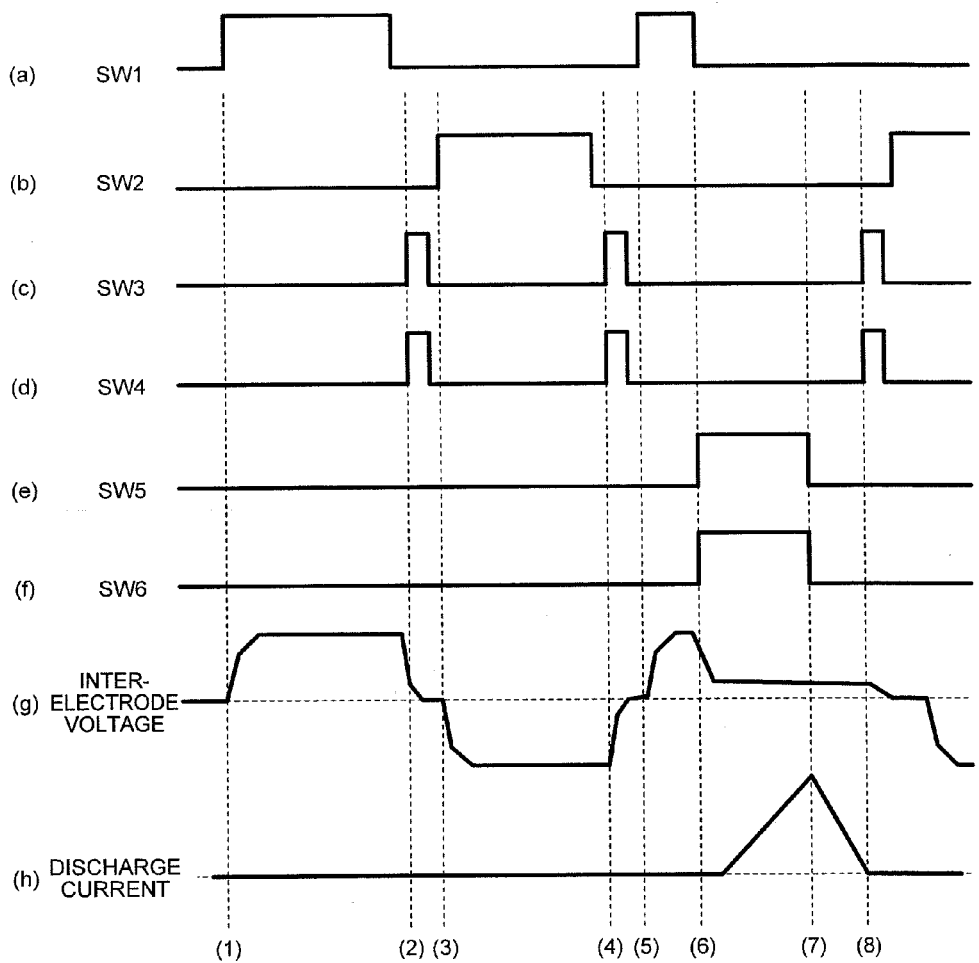
FIG. 5 is a diagram for explaining the operation of an electric discharge machining device according to the fourth embodiment of the present invention.

FIG. 5 is a diagram for explaining the operation of an electric discharge machining device according to the fourth embodiment of the present invention, where example waveforms of switching signals output from the controlling unit 8 and the corresponding waveforms of the inter-electrode voltage and the inter-electrode current are shown. The structure of the electric discharge machining device is the same as or similar to that of the first embodiment, and thus the explanation thereof is omitted.

(Operation of Electric Discharge Machining Device)

Next, the operation of the electric discharge machining device according to the present embodiment is explained with reference to FIGS. 1 and 5. The following explanation focuses on the operation of the preliminary discharge power supply 11 and the main discharge power supply 12 in the rough processing and intermediate finishing.

First, when the switching element SW1 is turned on at timing (1) and kept on for a predetermined period of time, the inter-electrode voltage is increased to the voltage of the first power supply 111 as indicated in (g) of this drawing. On the other hand, when water is adopted as a processing liquid, a bipolar voltage needs to be applied to the inter-electrode space to avoid electrical corrosion. For this reason, when discharging is not detected for a predetermined period of time under application of the voltage, the polarity needs to be reversed. Thus, by turning the switching element SW2 on at timing (3), the inter-electrode voltage is raised to the voltage of the second power supply 112.

Here, control is performed at timing (2) previous to timing (3) in such a manner that the switching elements SW3 and SW4 are turned on at a time (but it does not necessarily have to be exactly at the same time). Under this control, the positive inter-electrode voltage is dropped reliably to 0 volts. Furthermore, control is performed in such a manner that the negative inter-electrode voltage is dropped reliably to 0 volts by turning the switching elements SW3 and SW4 on at timing (4), and then the positive voltage pulse is applied again by turning the switching element SW1 on at timing (5).

Because the inter-electrode space serves as a capacitance component during the non-discharging, the charge accumulated at the previous charging time is pumped if the applied voltage is reversed with the charge being accumulated, and a high voltage momentarily appears between the electrodes. On the other hand, by turning the switching elements SW3 and SW4 on, the accumulated charge is reset so that a voltage higher than the power supply voltage is prevented from being applied to the inter-electrode space.

When discharging is detected at timing (6), control is performed so that the switching element SW1 is immediately turned off, the switching elements SW5 and SW6 for the main discharge pulsing are simultaneously turned on, and the main discharge current is supplied to the inter-electrode space. Under this control, the current flows in the path of the third power supply 121→the switching element SW5→the workpiece 3→the electrode 2→the switching element SW6→the third power supply 121. In addition, when control is performed to turn the switching elements SW5 and SW6 off at timing (7), the energy accumulated in the floating inductance component on the path is fed back to the third power supply 121 over the path of the electrode 2→the diode D8→the third power supply 121→the diode D7→the workpiece 3. At timing (8) at which the inter-electrode current is substantially no longer flowing, the switching elements SW3 and SW4 are turned back on.

When the inter-electrode current suddenly drops as in timings (7) to (8), the current oscillates, which may also oscillate the waveform of the inter-electrode voltage. If the next preliminary discharge pulse is applied in this situation, it is superimposed on the current preliminary discharge voltage, which tends to lead to degradation of the processing quality. Thus, the conventional electric discharge machining device provided with a preliminary discharge power supply and main discharge power supply needs to be designed to have a sufficient length of time between the end of a main discharge pulse and the application of the next preliminary discharge pulse.

Furthermore, because the conventional electric discharge machining device of this type is designed to induce discharging by the preliminary discharging circuit and pass the discharge current by the main discharging circuit, there is a possibility that the discharging may not continuously occur. In such a situation, the discharge current cannot be observed during timings (6) to (8), and the power supply voltage of the third power supply 121 is applied directly to the inter-electrode voltage. When the switching elements SW3 and SW4 are not turned on, the preliminary discharge voltage is pumped in addition to this high voltage. Thus, at the application of the next preliminary discharge pulse, the inter-electrode voltage is further increased, which may make the processing operation unstable.

In contrast, according to the present embodiment, as described above, excessive charge (excessive voltage) accumulated in the stray capacitance between the electrodes is consumed by turning the switching elements SW3 and SW4 on, and thus the length of time between the end of a main discharge pulse and the application of the next preliminary discharge pulse can be shortened. This leads to a higher processing speed and also to prevention of processing quality degradation. In addition, even when an unstable operation occurs and the preliminary discharge current does not flow continuously to the main discharge current, the inter-electrode state is reset in the next cycle in which another preliminary discharge pulse is applied, and thus the processing operation is stably carried out.

The present embodiment has focused on a control sequence of applying a main discharge pulse when discharging is detected based on preliminary discharge pulses of which the polarity is alternately reversed, but it is not limited thereto. The main point of the present invention resides in that the inter-electrode state is reset when the inter-electrode state becomes unstable. From this aspect, control may be performed to reset the inter-electrode voltage every time the polarity of the inter-electrode application voltage is reversed, or control may be performed to reset the inter-electrode voltage after the main discharge pulse is applied.

In addition, the explanation of the present embodiment has focused on the operation of the preliminary discharge power supply 11 and the main discharge power supply 12 in the rough processing and intermediate finishing by use of the electric discharge machining device according to the first embodiment, but the same operation can be performed by use of the electric discharge machining devices according to the second and third embodiments. In other words, the present invention includes the control according to the fourth embodiment applied to the electric discharge machining device according to the second and third embodiments.

INDUSTRIAL APPLICABILITY

As described above, the electric discharge machining device according to the present invention is effective as a technology of attaining both desired processing accuracy and desired controllability.

The invention claimed is:

1. An electric discharge machining device that performs processing by applying a voltage pulse between a processing electrode and a workpiece and suitably switching a polarity of the voltage pulse, comprising:
 a first DC power supply having a positive side electrically connected to a side of the workpiece and a negative side electrically connected to a side of the processing electrode;
 a first switch inserted in a current path connecting the first DC power supply to the workpiece and the processing electrode and connected to the first DC power supply in series;

a second DC power supply having a positive side electrically connected to a side of the processing electrode and a negative side electrically connected to a side of the workpiece;

a second switch inserted in a current path connecting the second DC power supply to the processing electrode and the workpiece and connected to the second DC power supply in series;

a third switch electrically connected in parallel between the first DC power supply and the first switch that are connected in series and the workpiece and the processing electrode;

a fourth switch electrically connected in parallel between the second DC power supply and the second switch that are connected in series and the workpiece and the processing electrode;

at least one resistor inserted in a current path from the first DC power supply to the processing electrode and the workpiece and in a current path from the second DC power supply to the processing electrode and the workpiece; and a controlling unit that generates and outputs switching signals to control the first to fourth switches based on processing information necessary for discharge processing, wherein:

the controlling unit switches the first switch from on-state to off-state, switches the second switch from off-state to on-state, and sets a period, in which the third switch is turned on right before reversing the polarity of the voltage pulse, and switches the second switch from on-state to off-state, switches the first switch from off-state to on-state, and sets a period, in which the fourth switch is turned on right before reversing the polarity of the voltage.

2. The electric discharge machining device according to claim 1, wherein the resistor comprises:

a first resistor having one end connected to the workpiece and being inserted in a current path connecting the first DC power supply to the workpiece; and a second resistor having one end connected to the workpiece and being inserted in a current path connecting the second DC power supply to the workpiece.

3. The electric discharge machining device according to claim 1, wherein:

the resistor is a shared resistor having one end connected to the processing electrode and being inserted in a common current path of the first DC power supply and the second DC power supply connecting the processing electrode to a connection point of the first DC power supply and the second DC power supply.

4. The electric discharge machining device according to claim 1, wherein:

the resistor is a shared resistor having one end connected to the workpiece and being inserted in a common current path connecting each of the first DC power supply and the second DC power supply to the workpiece.

5. An electric discharge machining device comprising a preliminary discharge power supply that applies a preliminary discharge pulse to space between a processing electrode and a workpiece, a main discharge power supply that applies a main discharge pulse to the space between the processing electrode and the workpiece, and a controlling unit that generates and outputs switching signals to control switches included in the preliminary discharge power supply and the main discharge power supply, and performing processing by suitably switching a timing and polarity of the preliminary discharge pulse and a timing of the main discharge pulse, wherein the preliminary discharge power supply comprises:

a first DC power supply having a positive side electrically connected to a side of the workpiece and a negative side electrically connected to a side of the processing electrode;

a first switch inserted in a current path connecting the first DC power supply to the workpiece and the processing electrode, and connected to the first DC power supply in series;

a second DC power supply having a positive side electrically connected to a side of the processing electrode and a negative side electrically connected to a side of the workpiece;

a second switch inserted in a current path connecting the second DC power supply to the processing electrode and the workpiece and connected to the second DC power supply in series;

a third switch electrically connected in parallel between the first DC power supply and the first switch that are connected in series and the workpiece and the processing electrode;

a fourth switch electrically connected in parallel between the second DC power supply and the second switch that are connected in series and the workpiece and the processing electrode; and at least one resistor inserted in a current path from the first DC power supply to the processing electrode and the workpiece and in a current path from the second DC power supply to the processing electrode and the workpiece, wherein the main discharge power supply comprises:

a third DC power supply having a positive side electrically connected to a side of the workpiece and a negative side electrically connected to a side of the processing electrode; and a fifth switch inserted in a current path from the third DC power supply to the workpiece and the processing electrode, wherein the controlling unit switches the fifth switch from on-state to off-state, switches the second switch from off-state to on-state and sets a period, in which the third switch is turned on right before reversing a polarity of a voltage pulse applied to space between the workpiece and the processing electrode.

6. The electric discharge machining device according to claim 5, wherein the resistor comprises:

a first resistor having one end connected to the workpiece and being inserted in a current path connecting the first DC power supply to the workpiece; and a second resistor having one end connected to the workpiece and being inserted in a current path connecting the second DC power supply to the workpiece.

7. The electric discharge machining device according to claim 5, wherein:

the resistor is a shared resistor having one end connected to the processing electrode and being inserted in a common current path of the first DC power supply and the second DC power supply connecting the processing electrode to a connection point of the first DC power supply and the second DC power supply.

8. The electric discharge machining device according to claim 5, wherein:

the resistor is a shared resistor having one end connected to the workpiece and being inserted in a common current path connecting each of the first DC power supply and the second DC power supply to the workpiece.

* * * * *